(12) United States Patent
Hasegawa et al.

(10) Patent No.: US 10,853,321 B2
(45) Date of Patent: Dec. 1, 2020

(54) STORAGE SYSTEM

(71) Applicant: Toshiba Memory Corporation, Minato-ku (JP)

(72) Inventors: Yohei Hasegawa, Fuchu (JP); Yoshiki Saito, Yokohama (JP); Shohei Onishi, Niiza (JP); Hidenori Matsuzaki, Fuchu (JP); Shigehiro Asano, Yokosuka (JP)

(73) Assignee: Toshiba Memory Corporation, Minato-ku (JP)

( * ) Notice: Subject to any disclaimer, the term of this patent is extended or adjusted under 35 U.S.C. 154(b) by 323 days.

(21) Appl. No.: 15/701,547

(22) Filed: Sep. 12, 2017

(65) Prior Publication Data

US 2018/0143992 A1 May 24, 2018

(30) Foreign Application Priority Data

Nov. 18, 2016 (JP) .................................. 2016-225179

(51) Int. Cl.
*G06F 12/00* (2006.01)
*G06F 16/17* (2019.01)
*G06F 12/02* (2006.01)
*G06F 3/06* (2006.01)

(52) U.S. Cl.
CPC ........ *G06F 16/1727* (2019.01); *G06F 3/0604* (2013.01); *G06F 3/064* (2013.01); *G06F 3/0608* (2013.01); *G06F 3/0688* (2013.01); *G06F 12/0246* (2013.01); *G06F 2212/7208* (2013.01)

(58) Field of Classification Search
CPC .... G06F 12/0246; G06F 3/064; G06F 3/0619; G06F 3/0688; G06F 11/108
See application file for complete search history.

(56) References Cited

U.S. PATENT DOCUMENTS

| 8,880,788 | B1 | 11/2014 | Sundaram et al. | |
|---|---|---|---|---|
| 9,417,809 | B1 | 8/2016 | Camp et al. | |
| 2009/0240873 | A1* | 9/2009 | Yu | G06F 3/0608 |
| | | | | 711/103 |
| 2015/0261797 | A1* | 9/2015 | Alcantara | G06F 16/217 |
| | | | | 707/813 |
| 2016/0110111 | A1* | 4/2016 | Song | G06F 3/0607 |
| | | | | 711/103 |

(Continued)

FOREIGN PATENT DOCUMENTS

JP 2010-009548 A 1/2010

*Primary Examiner* — Arvind Talukdar
(74) *Attorney, Agent, or Firm* — Oblon, McClelland, Maier & Neustadt, L.L.P.

(57) ABSTRACT

A storage system includes non-volatile storage devices and a control device. Each of the storage devices is divided into blocks, and data is erased in units of the blocks. The control device includes a setting unit and a writing/reading unit. The setting unit sets first storage regions obtained by dividing a storage region for each of the storage devices and sets second storage regions obtained by dividing storage regions of all of the storage devices for all of the storage devices. The writing/reading unit manages data stored in the storage devices in units of the second storage regions. The setting unit sets each of the first storage regions so that the first storage region for at least one of the plurality of storage devices includes the entirety of one or more blocks and sets each of the second storage regions to include two or more of the first storage regions.

14 Claims, 10 Drawing Sheets

(56) References Cited

U.S. PATENT DOCUMENTS

2017/0160960 A1* 6/2017 Camp .................. G06F 3/0619
2018/0095873 A1* 4/2018 Nakagoe ................ G06F 12/16
2018/0203631 A1* 7/2018 Doi .................... G06F 12/0246

* cited by examiner

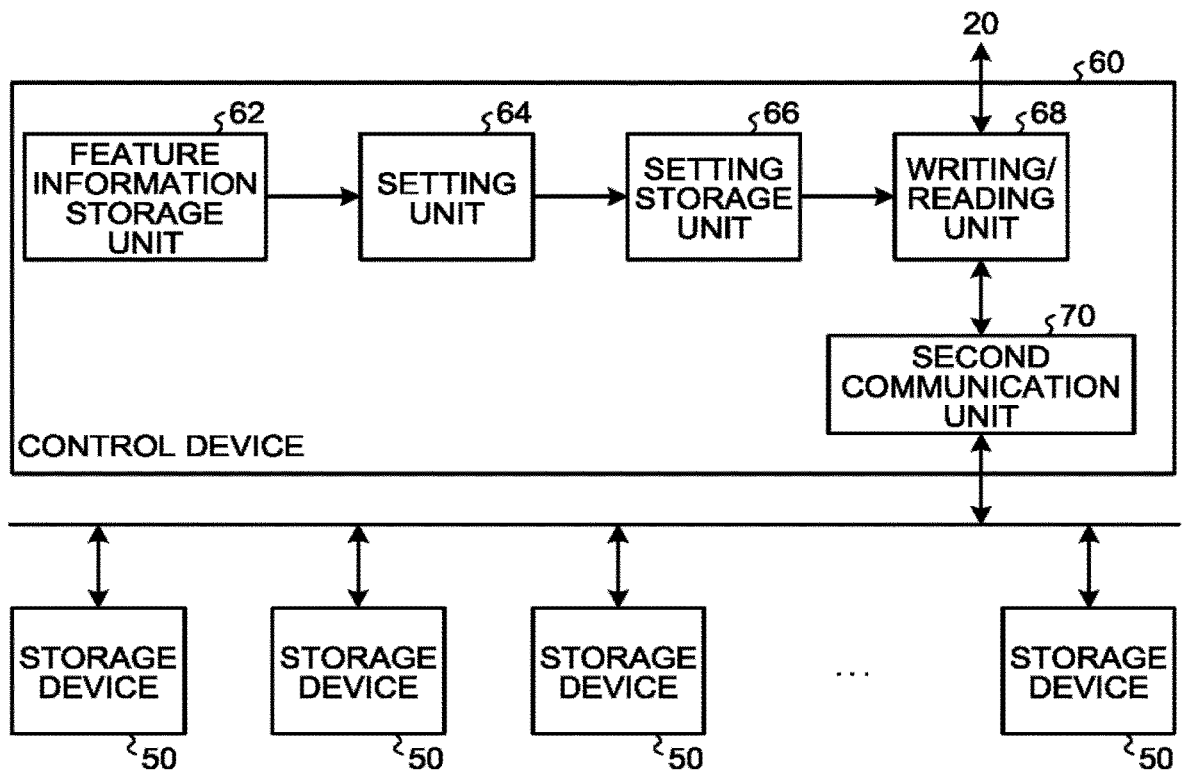

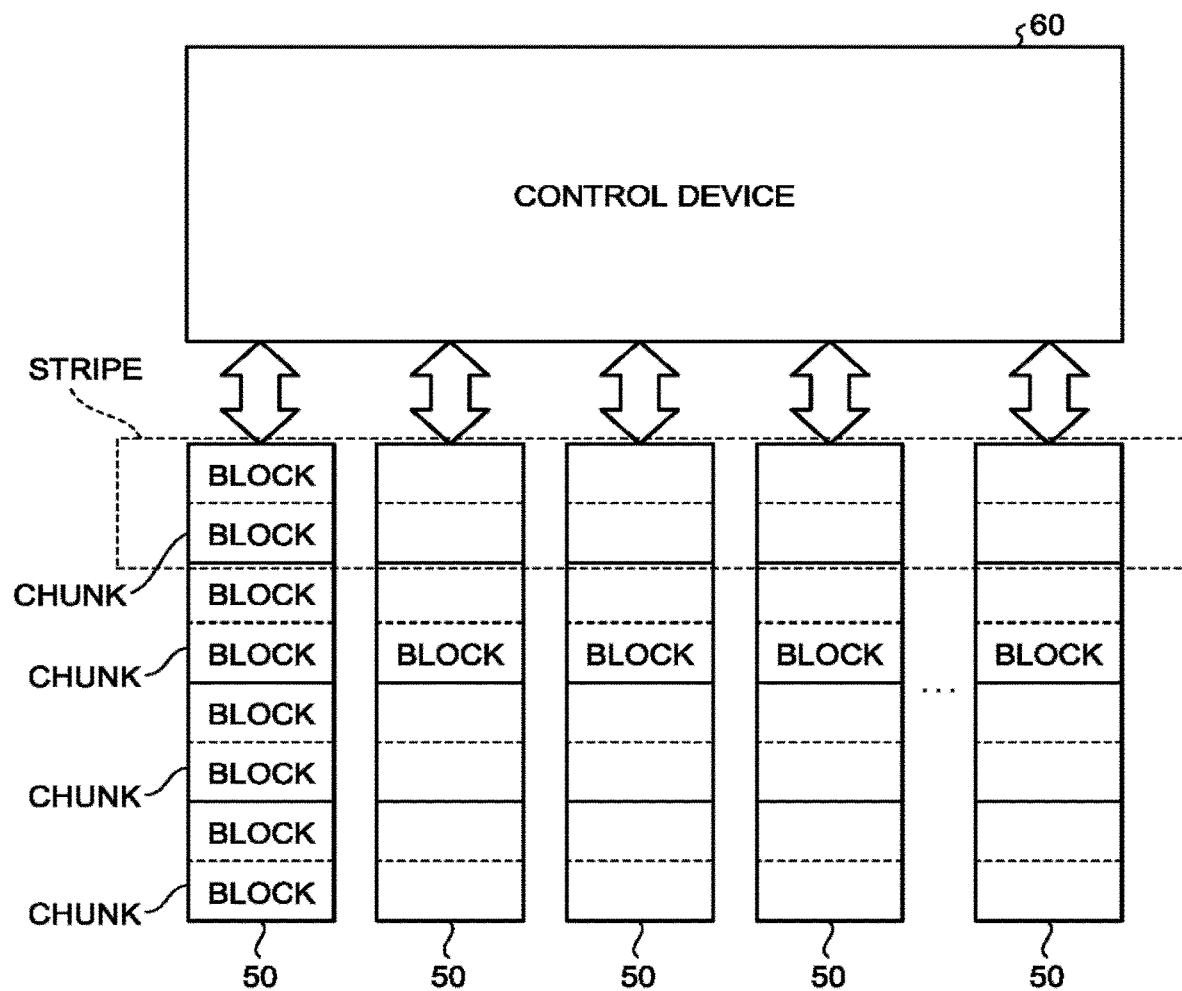

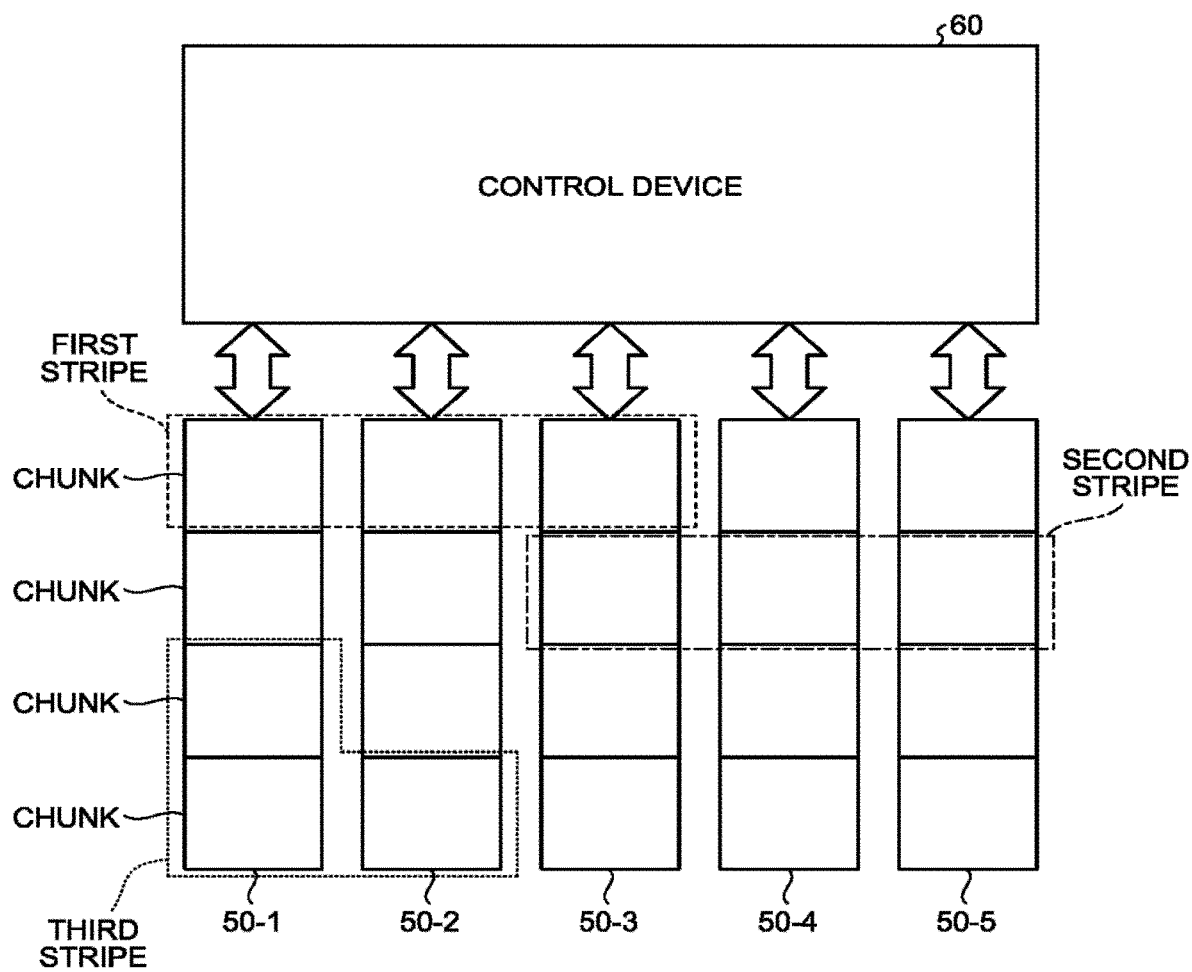

FIG.12

| ATTRIBUTE INFORMATION | | FEATURE INFORMATION |
|---|---|---|
| Product ID=A | | Block Size=1MB |
| Product ID=B | | Block Size=8MB |
| Product ID=C | | Block Size=1GB |
| | FW Ver.=1 | Block Size=100MB |
| | FW Ver.=2 | Block Size=200MB |
| Product ID=D | | Block Size=16MB |

⋮

STORAGE SYSTEM

CROSS-REFERENCE TO RELATED APPLICATIONS

This application is based upon and claims the benefit of priority from Japanese Patent Application No. 2016-225179, filed on Nov. 18, 2016; the entire contents of which are incorporated herein by reference.

FIELD

Embodiments described herein relate generally to a storage system.

BACKGROUND

A storage device called a solid state drive (SSD) is known. The SSD is a device using a non-volatile semiconductor memory such as a NAND flash memory. Further, a method of using a plurality of SSDs as one virtual storage resource by applying an SSD as a storage device for redundant arrays of inexpensive disks (RAID) is also known.

Meanwhile, data is unable to be overwritten in the SSD. Further, in the SSD, data is erased only in units of blocks. For this reason, in the SSD, a process called garbage collection is periodically executed to generate an empty block in which data can be written. In the garbage collection, valid data stored in a block to be processed is moved to another block, and then an erasing process is performed on the block to be processed. For this reason, if the garbage collection occurs frequently, the data stored in the SD may be dispersed, and the access speed may be reduced.

In the RAID, in order to achieve distributed recording and redundancy, data invalidation and writing are performed in access units formed crossing through a plurality of devices, that are called "stripes". The stripe is set by an RAID control device. On the other hand, the block is independently set for each individual SSD, and the size or the like may be unclear depending on the manufacturer.

For this reason, in the RAID to which the SSD is applied, the stripe is not associated with the block. For this reason, in the RAID to which the SSD is applied, if data is invalidated in units of stripes, invalidated data and valid data are mixed in the block. Therefore, when such blocks increasingly occur, the SSD has to perform the garbage collection and generate an empty block. As a result, the access speed is likely to be reduced in the RAID to which the SSD is applied.

BRIEF DESCRIPTION OF THE DRAWINGS

FIG. 3 is a diagram illustrating a functional configuration of a control device together with a plurality of storage devices;

FIG. 4 is a diagram illustrating an example of feature information;

FIG. 5 is a diagram illustrating an example of a relation of a block, a chunk, and a stripe;

FIG. 6 is a diagram illustrating an example of a stripe including chunks of two or more different storage devices;

FIG. 12 is a diagram illustrating an example of an attribute information table.

DETAILED DESCRIPTION

In general, according to one embodiment, a storage system includes a plurality of non-volatile storage devices configured to be able to perform writing and reading of data independently, and a control device configured to control writing of data and reading of data on the plurality of storage devices. In the storage system, each of the plurality of storage devices is divided into a plurality of blocks and erases data in units of the blocks. And, the control device includes a setting unit configured to set a plurality of first storage regions obtained by dividing a storage region for each of the plurality of storage devices, and set a plurality of second storage regions obtained by dividing storage regions of all of the plurality of storage devices for all of the plurality of storage devices, and a writing/reading unit configured to manage data stored in the plurality of storage devices in units of the second storage regions. The setting unit sets each of the first storage regions so that the first storage region for at least one of the plurality of storage devices includes the entirety of one or more blocks, and sets each of the second storage regions to include wo or more of the first storage regions.

Hereinafter, exemplary embodiments will be described in detail with reference to the accompanying drawings. A computer system 10 according to the present embodiment suppresses a decrease in an access speed at which a host computer 20 accesses a storage system 30.

Figure 1:
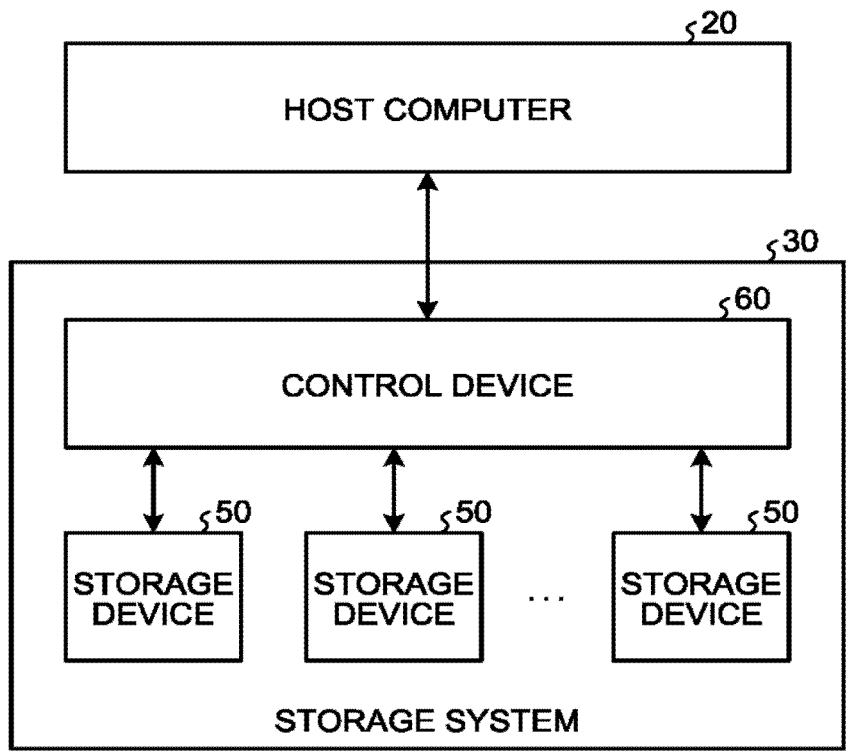
FIG. 1 is a block diagram of a computer system according to an embodiment.

FIG. 1 is a diagram illustrating a configuration of a computer system 10 according to an embodiment. The computer system 10 includes a host computer 20 and a storage system 30.

The host computer 20 may be, for example, a general computer that includes a processor and a main memory and executes programs. The host computer 20 uses the storage system 30 as a storage resource. The host computer 20 and the storage system 30 are connected via an interface such as a PCI Express.

The storage system 30 includes a plurality of storage devices 50 and a control device 60. For example, the plurality of storage devices 50 and the control device 60 are manufactured by a single manufacturer and are integrally arranged in one housing.

A plurality of storage devices 50 are non-volatile storage devices that are able to write and read data independently of one another. Each of the plurality of storage devices 50 includes, for example, a plurality of non-volatile semiconductor memories. Each of the plurality of storage devices 50 is, for example, an SSD. The SSD is a device using a non-volatile semiconductor memory such as a NAND flash memory.

The control device 60 performs communication with the host computer 20. Further, the control device 60 executes control such that the host computer 20 accesses the plurality of storage devices 50 as one virtual storage resource. The control device 60 receives a write command and a read command which are given to the storage system 30 from the host computer 20. The control device 60 controls writing of data and reading of data which are performed on the plurality of storage devices 50 in accordance with the commands given from the host computer 20.

Figure 2:
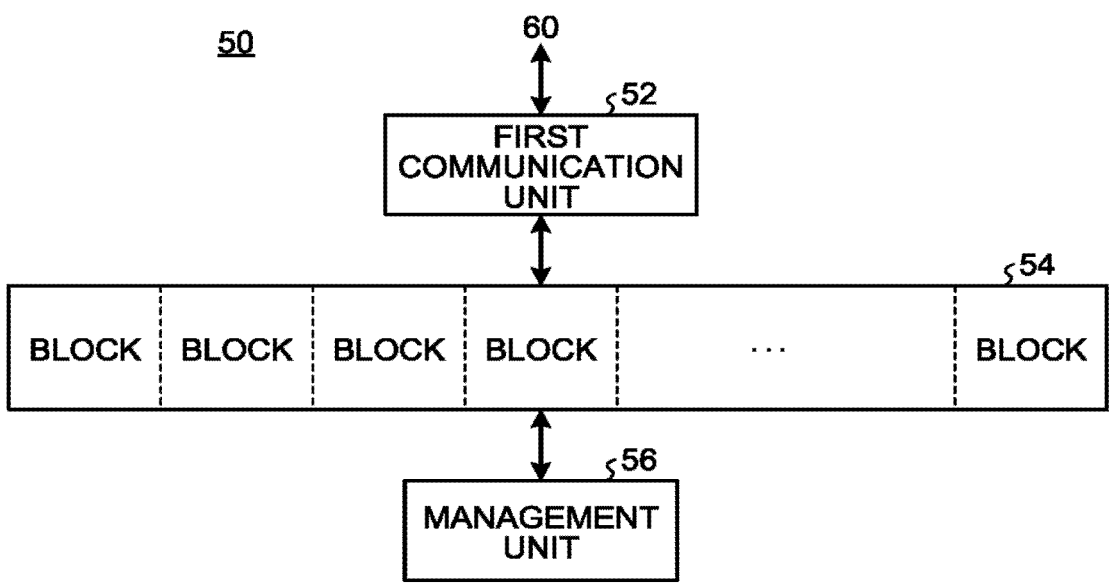
FIG. 2 is a diagram illustrating a functional configuration of a storage device.

FIG. 2 is a diagram illustrating a functional configuration of the storage device 50. Each of the plurality of storage devices 50 includes a first communication unit 52, a data storage unit 54, and a management unit 56.

The first communication unit 52 reads data from a designated address in the data storage unit 54 in response to the read command given from the control device 60. The first communication unit 52 writes data at a designated address in the data storage unit 54 in response to the write command given from the control device 60. The first communication unit 52 invalidates the data written at the designated address in the data storage unit 54 in response to an invalidation command given from the control device 60.

The data storage unit 54 is a storage region implemented by the plurality of non-volatile semiconductor memories. The data storage unit 54 is divided into a plurality of blocks. In other words, the blocks are regions obtained by dividing the storage region implemented by the plurality of non-volatile semiconductor memories. A size of each block is individually set for each storage device 50. For example, the size of the block is set by the manufacturer of the storage device 50 or the like.

The storage device 50 erases the data written in the data storage unit 54 in units of blocks. The storage device 50 does not erase the written data in units smaller than the block. Further, the storage device 50 can write data in a block from which data is erased in order from a head address. The storage device 50 is unable to write data at an address at which data is written before the data is erased in units of blocks.

The management unit 56 manages the data stored in the data storage unit 54. For example, the management unit 56 executes the garbage collection at regular intervals or at a predetermined timing and generates an empty block in the data storage unit 54. For example, the management unit 56 moves valid data stored in the block to be processed to another block and then erases the data written in the block to be processed. Accordingly, the management unit 56 can newly write data starting from the head address of the block to be processed thereafter. The management unit 56 may execute the garbage collection at its own timing. For example, the management unit 56 may execute the garbage collection regardless of an instruction of the control device 60. Further, the management unit 56 may perform the garbage collection asynchronously with other storage devices 50.

FIG. 3 is a diagram illustrating a functional configuration of the control device 60 together with the plurality of storage devices 50. FIG. 4 is a diagram illustrating an example of feature information.

The control device 60 includes a feature information storage unit 62, a setting unit 64, a setting storage unit 66, a writing/reading unit 68, and a second communication unit 70.

The feature information storage unit 62 stores feature information. The feature information indicates a block forming region for each of the plurality of storage devices 50.

For example, the feature information includes a start address and a size of each block for each of the plurality of storage devices 50. Further, if sizes of the blocks in the respective storage devices 50 are equal, the feature information includes the size of the block for each of the plurality of storage devices 50. Further, when one block is formed in the storage device 50 in a distributed manner, the feature information may further include information indicating addresses in which each block is distributed. For example, the feature information includes the size of the block for each storage device 50 disposed in the storage system 30 as illustrated in FIG. 4.

The feature information storage unit 62 may be a non-volatile memory. For example, the feature information storage unit 62 may be a read only memory (ROM) in which writing is performed when the storage system 30 is manufactured and thereafter neither overwriting nor erasing is allowed. Further, the feature information storage unit 62 may be configured or set not to read the feature information from a device outside the control device 60.

The setting unit 64 sets a plurality of chunks (first storage regions) obtained by dividing the storage region for each of the plurality of storage devices 50. Further, the setting unit 64 sets a plurality of stripes (second storage regions) obtained by dividing the storage regions of all of the plurality of storage devices 50 for all of the plurality of storage devices 50.

More specifically, the setting unit 64 sets each chunk so that the chunk for at least one of the plurality of storage devices 50 includes all of one or more blocks. Further, the setting unit 64 sets each stripe to include two or more chunks. In this case, the setting unit 64 includes, in each stripe, two or more chunks selected from two or more different storage devices 50 among the plurality of storage devices 50. The chunk and the stripe will be further described with reference to FIG. 5 and subsequent drawings.

For example, the setting unit 64 acquires the feature information stored in the feature information storage unit 62. The setting unit 64 then sets the chunk on the basis of the acquired feature information. Further, the setting unit 64 sets the stripe on the basis of the set chunk.

The setting unit 64 may set the chunk and the stripe, for example, when the storage system 30 is initialized. Further, the setting unit 64 may set the chunk and the stripe at regular intervals after the operation of the storage system 30.

The setting storage unit 66 stores information related to the chunk and the stripe set by the setting unit 64. For example, the setting storage unit 66 stores the position and the size of each chunk set for each of the plurality of storage devices 50. Further, the setting storage unit 66 stores information indicating chunks included in each stripe set for the storage regions of all of the plurality of storage devices 50.

The writing/reading unit 68 distributedly writes data received from the host computer 20 in the plurality of storage devices 50 in accordance with an instruction given from the host computer 20. The writing/reading unit 68 reads the data written in the plurality of storage devices 50 and transmits the read data to the host computer 20 in accordance with an instruction given from the host computer 20.

Further, the writing/reading unit 66 manages the data stored in the plurality of storage devices 50 in units of chunks and stripes on the basis of the chunks and the stripes stored in the setting storage unit 66. For example, the writing/reading unit 68 invalidates the data stored in the plurality of storage devices 50 in units of stripes.

The second communication unit 70 controls transmission and reception of data between each of the plurality of storage devices 50 and the writing/reading unit 68.

Each of the plurality of storage devices 50 may be configured not to output the feature information indicating the forming region of each block. In this case, if the manufacturer of the storage system 30 knows the information on the block of the storage device 50, the feature information can be stored in the feature information storage unit 62.

Further, each of the plurality of storage devices 50 may be able to output feature information indicating the forming region of each block in response to a request from the control device 60. For example, the setting unit 64 acquires the feature information from each of the plurality of storage devices 50. Then, the setting unit 64 may set the chunk and the stripe on the basis of the acquired feature information. Further, the control device 60 may be configured not to include the feature information storage unit 62 when the storage device 50 outputs the feature information.

FIG. 5 is a diagram illustrating an example of a relation of the block, the chunk, and the stripe. The setting unit 64 sets the chunk and the stripe with reference to the feature information.

The setting unit 64 sets each chunk so that the chunk for at least one of the plurality of storage devices 50 includes the entirety of one or more blocks.

For example, in the example illustrated in FIG. 5, all the blocks included in each of the plurality of storage devices 50 have an equal size and are formed as storage regions without being divided. In this case, the setting unit 64 may set all the chunks to have a size which is N times the size of the block (N is an integer of 1 or more). For example, the setting unit 64 may set the chunk to have the same size as the block. The setting unit 64 causes a start position of each chunk to match a head position of the block. Accordingly, the setting unit 64 can set each chunk so that the chunks for all the storage devices 50 include the entirety of the N blocks.

Then, the setting unit 64 sets each stripe to include two or more chunks. In this case, the setting unit 64 includes, in each stripe, two or more chunks selected from two or more different storage devices 50 among the plurality of storage devices 50. In other words, the setting unit 64 sets each stripe to include two or more chunks selected from two or more different storage devices 50.

For example, in the example illustrated in FIG. 5, all the chunks have an equal size, and the plurality of storage devices 50 have an equal storage capacity. Therefore, the plurality of storage devices 50 includes the same number of chunks as one another. In this case, the setting unit 64 sets a plurality of stripe respectively including chunks obtained by selecting one chunk from each of the plurality of storage devices 50.

The setting unit 64 can cause each block to be included in only one stripe by setting the chunk and the stripe as described above. In other words, the setting unit 64 can prevent one block from being included in a plurality of stripes.

Accordingly, the setting unit 64 is able to invalidate data in all blocks collectively when data is invalidated in units of stripes. In other words, the setting unit 64 is able to avoid generation of blocks in which some pieces of data are invalidated but other data is valid. Therefore, in the storage system 30, it is possible to suppress the decrease in access speed while reducing the occurrence frequency of the garbage collection.

FIG. 6 is a diagram illustrating an example of three stripes including chunks of two or more different storage devices 50.

For example, a first stripe, a second stripe, and a third stripe set by the setting unit 64 are illustrated in FIG. 6. The first stripe includes two or more chunks selected a first combination of two or more storage devices 50. More specifically, the first stripe includes three chunks selected from a first storage device 50-1, a second storage device 50-2, and a third storage device 50-3.

The second stripe includes two or more chunks selected from a second combination of two or more storage devices 50 different from the first combination. More specifically, the second stripe includes three chunks selected from the third storage device 50-3, a fourth storage device 50-4, and a fifth storage device 50-5.

As described above, the setting unit 64 may set a plurality of stripes each including two or more chunks selected from different combinations of two or more storage devices 50 among the plurality of storage devices 50. Accordingly, the setting unit 64 can set a stripe of a combination having a high degree of freedom.

Further, for example, the third stripe includes two chunks included in the first storage device 50-1 and one chunk included in the second storage device 50-2. As described above, the setting unit 64 may select different numbers of chunks from the storage devices 50 and include the selected chunks in the stripe. Accordingly, the setting unit 64 can set a stripe of a combination having a high degree of freedom.

Figure 7:
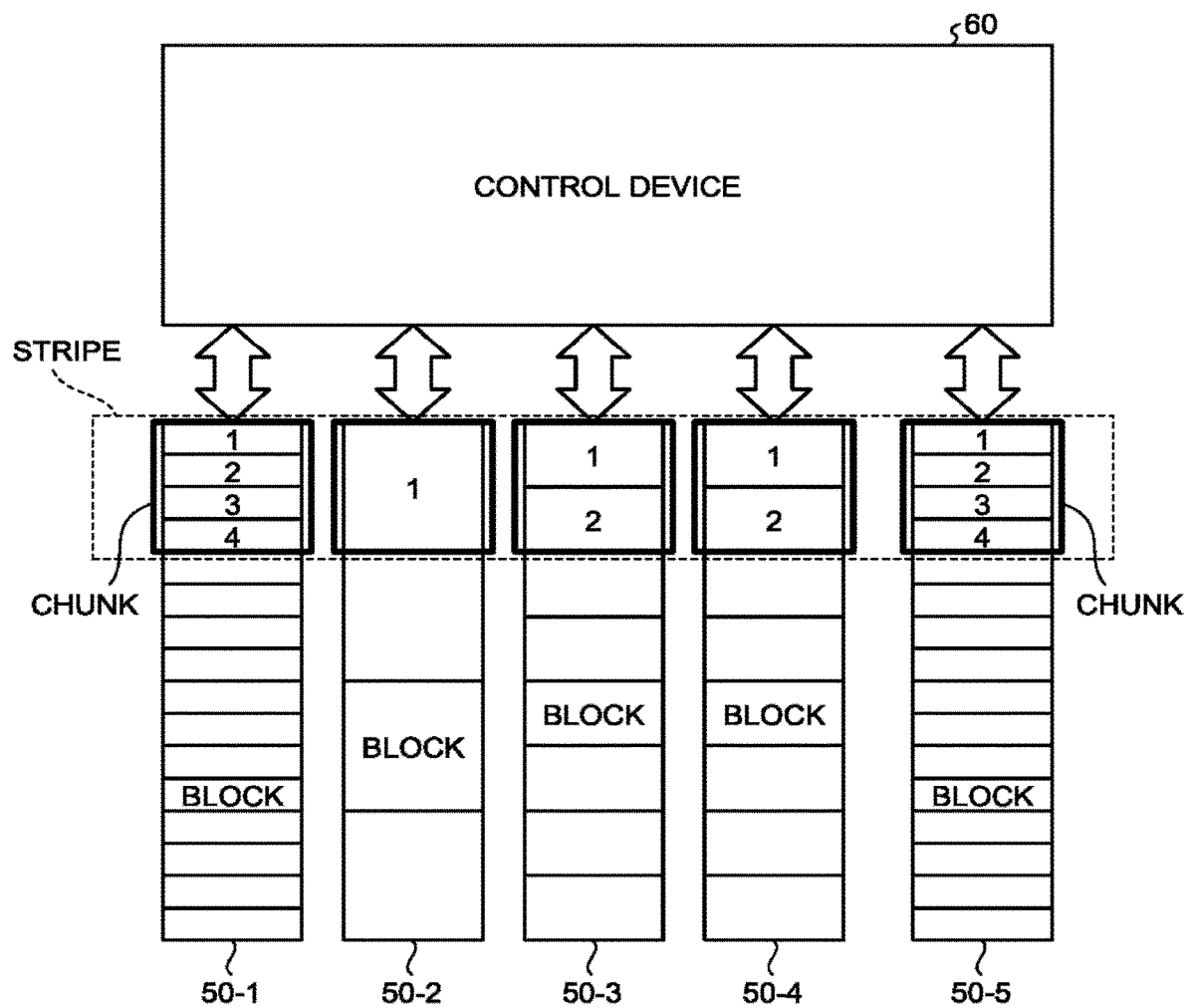
FIG. 7 is a relation diagram of a chunk and a stripe when sizes of blocks are different.

FIG. 7 is a diagram illustrating an example of a relation of the chunk and the stripe when sizes of blocks in the respective storage devices 50 are different.

For example, the size of the block included in the first storage device 50-1 among the plurality of storage devices 50 may be different from the size of the block included in the second storage device 50-2. In this case, the setting unit 64 may change the number of blocks included in the chunk of the first storage device 50-1 and the number of blocks included in the chunk of the second storage device 50-2.

For example, in the example of FIG. 7, the number of blocks included in the chunk of the first storage device 50-1 is four. Further, the number of blocks included in the chunk of the second storage device 50-2 is one. The number of blocks included in the chunk of the third storage device 50-3 or t fourth storage device 50-4 is two. The number of blocks included in the chunk of the fifth storage device 50-5 is four. As described above, the setting unit 64 may include a different number of blocks in the chunk for each storage device 50.

Further, the setting unit 64 may set a common multiple (for example, a least common multiple) of the sizes of the blocks included in the plurality of storage devices 50 as the size of the chunk. Accordingly, the setting unit 64 can set each chunk so that all the chunks have an equal size.

Further, the setting unit 64 may change the size of chunk for each storage device 50. Accordingly, the setting unit 64 can increase a degree of freedom for setting the chunk.

Figure 8:
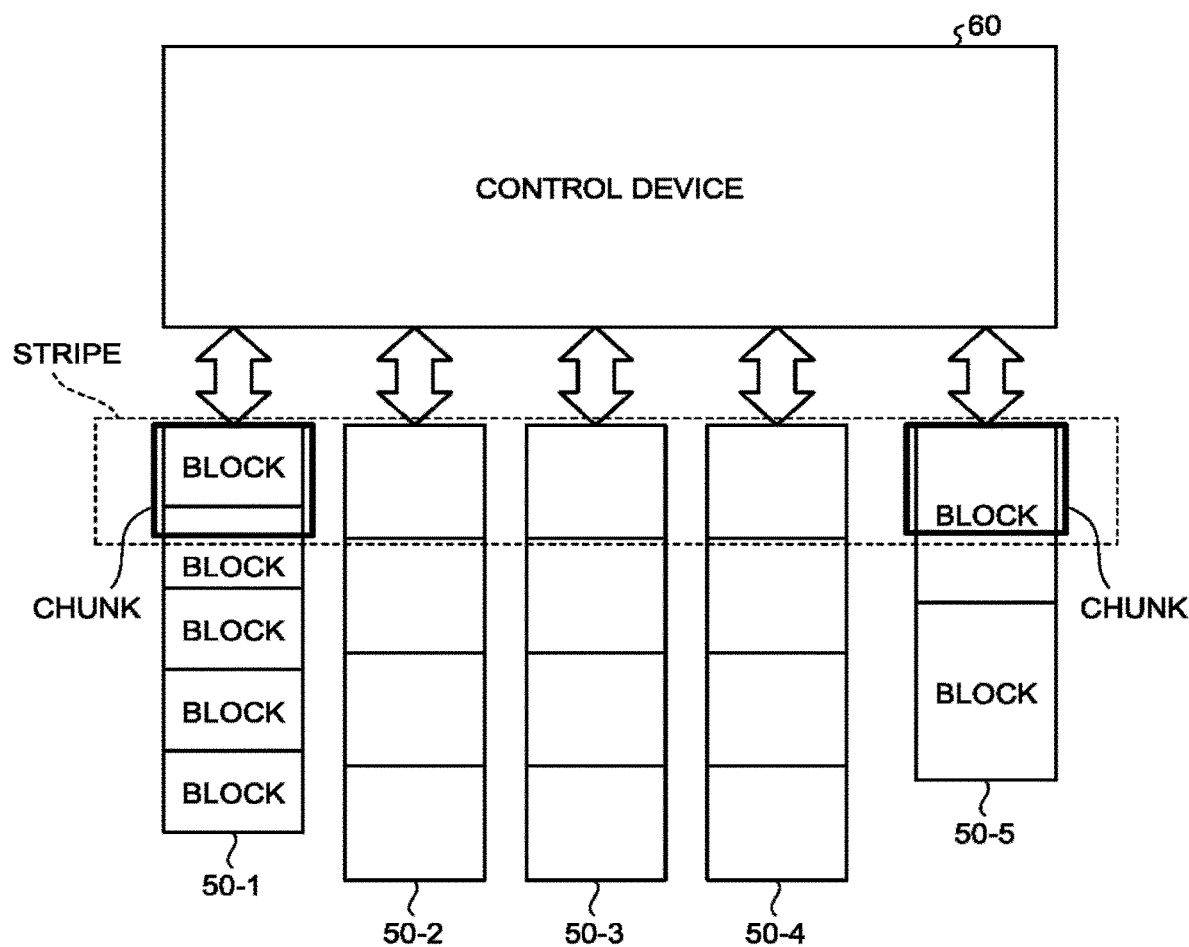
FIG. 8 is a diagram illustrating an example of a chunk including a part of a block.

FIG. 8 is a diagram illustrating an example of a chunk including a cart of the block.

The setting unit 64 may set a chunk for any one or more storage devices 50 so that the chunk includes a part of the block but does not include the other part. In other words, the setting unit 64 may set a chunk for any one or more storage devices 50 so that one block is included in two or more chunks. For example, in the example of FIG. 8, a chunk set for the first storage device 50-1 and the fifth storage device 50-5 includes a part of a block and does not include the other part of the block. For example, the setting unit 64 may set a chunk of at least one storage device 50 to have a size which is a natural number multiple of the size of the block and set chunks of the other storage devices 50 to include a part of the block and not include the other part.

Even when a chunk of any one or more storage devices 50 is set to include a part of the block but not to include the other part of the block, the chunks of the other storage devices 50 are set to include the entire block. Therefore, the storage system 30 can suppress the decrease in the access speed while reducing the occurrence frequency of the garbage collection for the storage device 50 including the chunk set to include the entire block.

Figure 9:
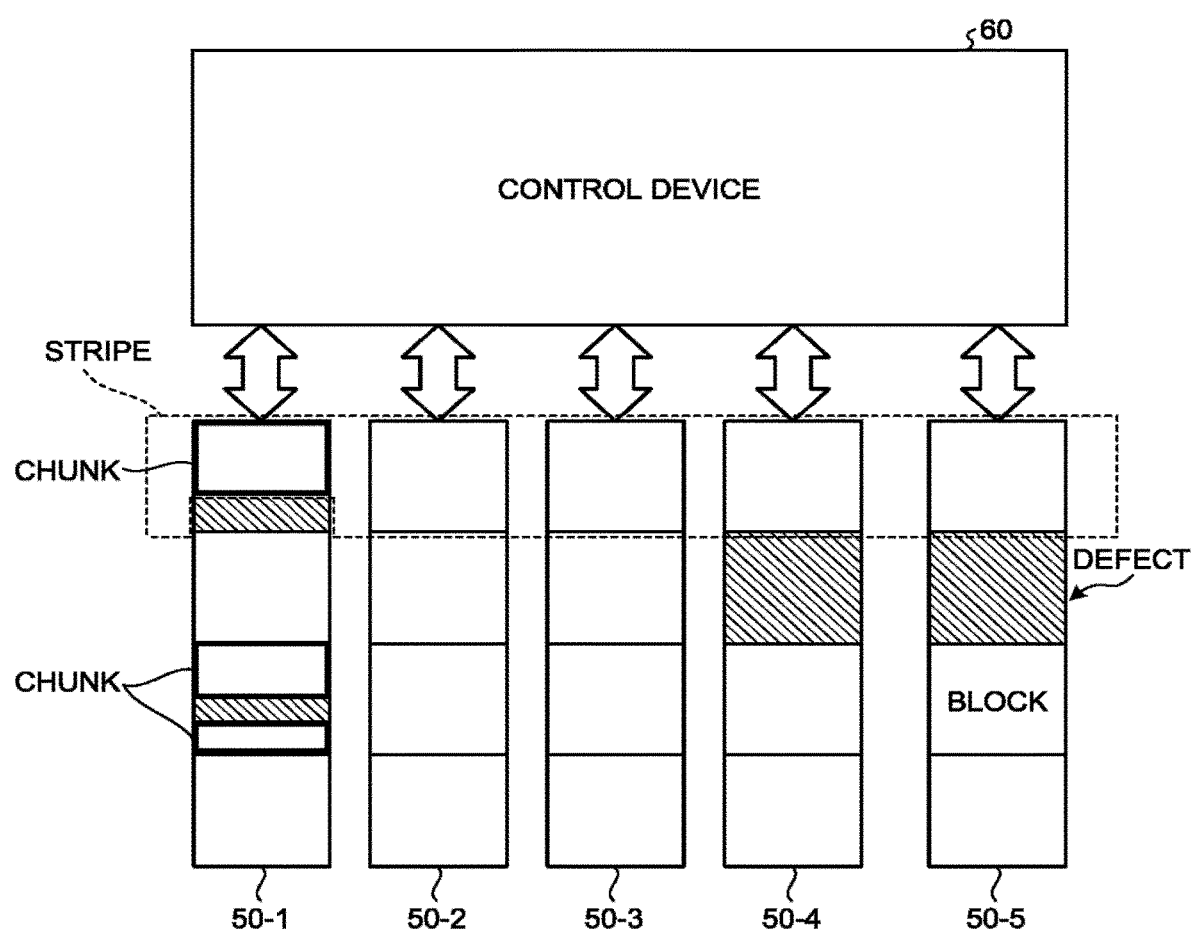
FIG. 9 is a relation diagram of a block and a chunk when a defective portion is included in a storage device.

FIG. 9 is a diagram illustrating an example of a relation between the block and the chunk when the storage device 50 includes a defective portion.

The storage device 50 may include a defective portion in which data is unable to be written. In this case, the setting unit 64 acquires positional information of the defective portion in each of the plurality of storage devices 50 before the chunk and the stripe are set. The setting unit 64 then sets each chunk to include the entire region excluding the defective portion in the block.

For example, in the example of FIG. 9, the setting unit 64 performs a setting so that a part of the chunk of the first storage device 50-1 includes the entire region excluding the defective portion in the block. By setting the chunk as described above, the setting unit 64 can prevent data from being written or read in or from the defective portion.

In a case in which the defective portion exists in the middle of the block, the setting unit 64 may set a chunk which is divided into a plurality of regions. For example, in the example of FIG. 9, the setting unit 64 divides a part of the chunk of the first storage device 50-1 into a plurality of regions.

Further, the setting unit 64 may acquire positional information of the defective portion found at the time of shipping from a factory or the like from each of the plurality of storage devices 50, for example, when the storage system 30 is initialized. Further, the setting unit 64 may acquire positional information of the defective portion from the storage device 50 at regular intervals or at a predetermined timing. In this case, the setting unit 64 resets the chunk so that a newly found defective portion is excluded.

Figure 10:
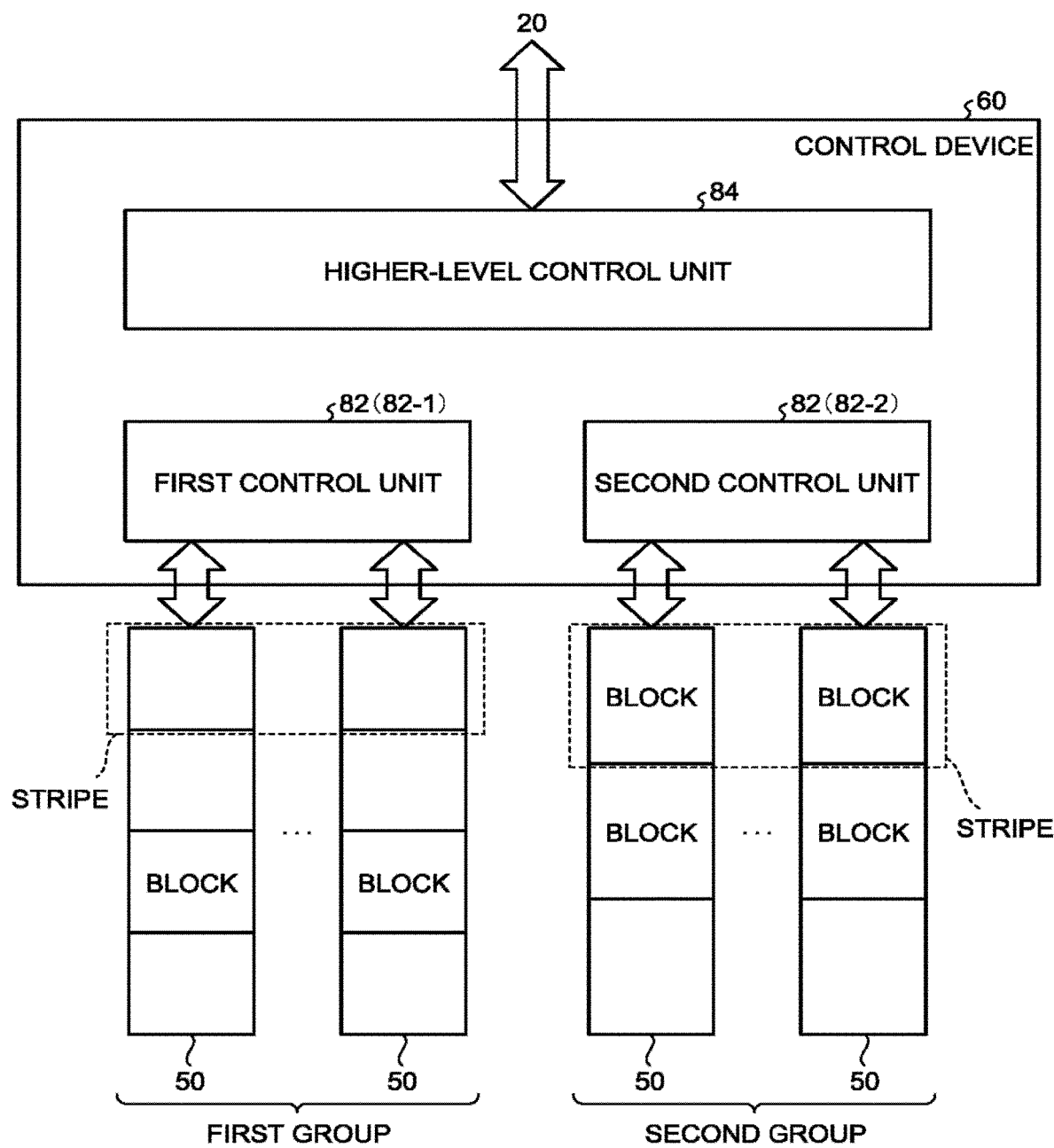
FIG. 10 is a configuration diagram of a storage system when a control device has a plurality of control units.

FIG. 10 is a diagram illustrating a configuration of the storage system 30 in which the control device 60 includes a plurality of control units 82.

The control device 60 may include the plurality of control units 82 and a higher-level control unit 84. A plurality of control units 82 control writing of data and reading of data on different groups among the plurality of storage devices 50. The higher-level control unit 84 performs exchange with each of the plurality of control units 82. Further, the higher-level control unit 84 exchanges data with the host computer 20 and allocates a command given from the host computer 20 to any one of the control units 82.

Each of the control units 82 has the same functional configuration as that of the control device 60 illustrated in FIG. 3. In other words, each of the control unit 82 includes the feature information storage unit 62, the setting unit 64, the setting storage unit 66, the writing/reading unit 68, and the second communication unit 70. The writing/reading unit 68 of each of the control unit 82 manages data stored in two or more storage devices 50 belonging to a corresponding group in units of set stripes.

Further, the setting unit 64 of each of the control unit 82 sets a chunk of a unique size for the storage devices 50 belonging to the corresponding group. For example, the setting unit 64 of each of the control unit 82 may set chunks of sizes different from those of the other control units 82 for the storage devices 50 belonging to the corresponding group.

For example, in an example of FIG. 10, a first control unit 82-1 controls writing of data and reading of data on the plurality of storage devices 50 belonging to a first group. A second control unit 82-2 controls writing of data and reading of data on the plurality of storage devices 50 belonging to a second group different from the first group. The setting unit 64 of the first control unit 82-1 and the setting unit 64 of the second control unit 82-2 set chunks of different sizes.

As described above, the storage system 30 can manage the plurality of storage devices 50 in accordance with each group. Thus, according to the storage system 30, a degree of freedom for setting the stripe can be increased.

Figure 11:
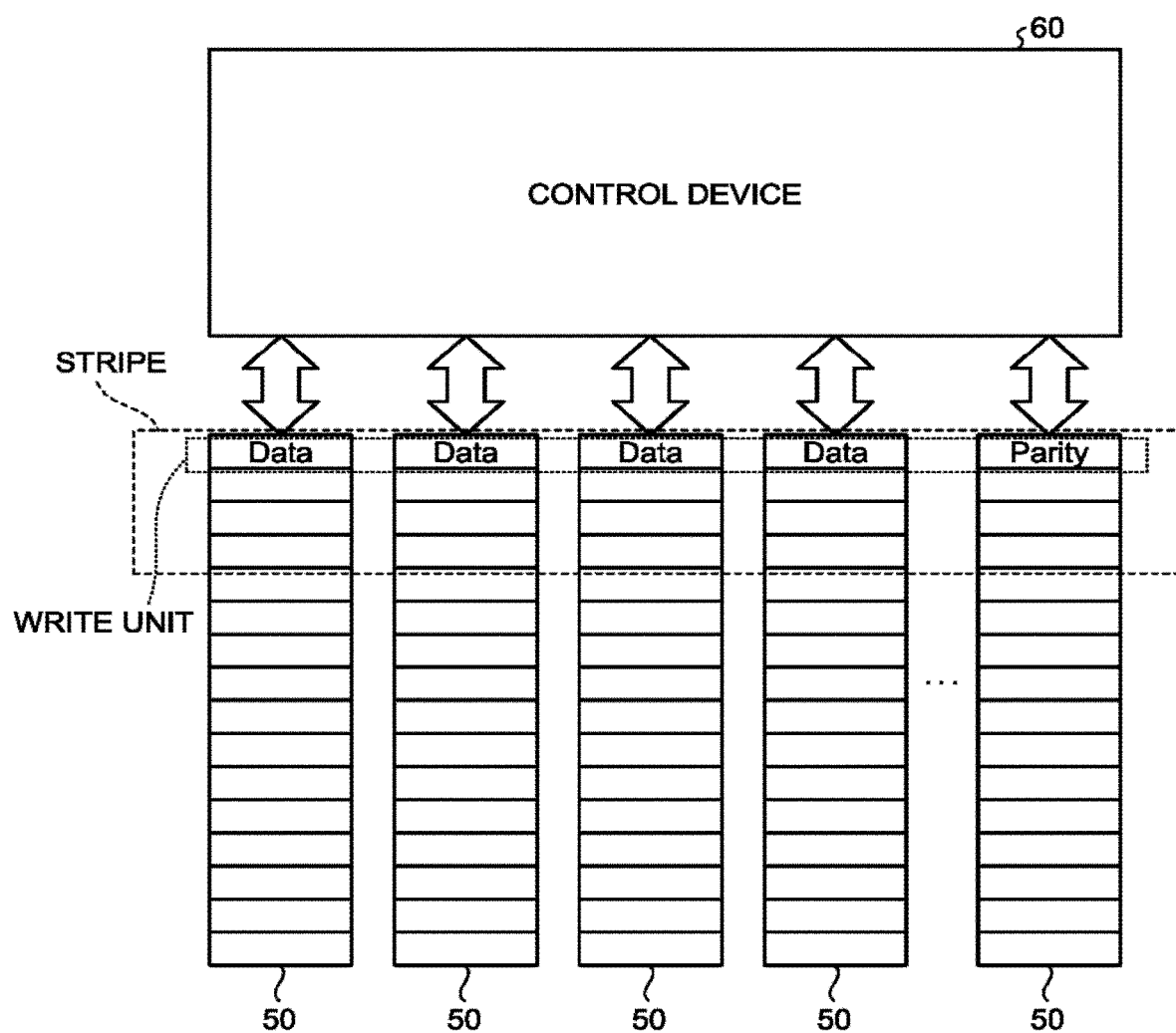
FIG. 11 is a relation diagram of a stripe and a write unit.

FIG. 11 is a diagram illustrating an example of a relation of a stripe and a write unit. The setting unit 64 sets a plurality of write units obtained by dividing the stripe for each stripe. The writing/reading unit 68 writes data in the set write unit. Specifically, the writing/reading unit 68 writes a set of writing target data and a parity of the target data in the write unit.

Here, each write unit includes a part of each of a plurality of chunks included in a corresponding stripe. For example, the write unit includes a small region selected each of a plurality of chunks when each of a plurality of chunks included in a corresponding stripe is divided into a predetermined number of small regions.

Accordingly, the writing/reading unit 68 is able to write data in the plurality of storage devices 50 in a distributed manner. Further, the writing/reading unit 68 is able to restore data written using a parity even when any of the storage devices 50 has a failure.

FIG. 12 is a diagram illustrating an example of an attribute information table. For example, the feature information storage unit 62 may store the attribute information table illustrated in FIG. 12 instead of the feature information.

The attribute information table stores attribute information of each of the plurality of storage devices 50 in association with the feature information indicating the forming region of the block of the corresponding storage device 50. For example, the attribute information may be an identification number identifying an architecture of the storage device 50, a version number identifying firmware of the storage device 50, or the like. For example, the attribute information table stores the feature information for each architecture and firmware of the storage device 50. The attribute information may be other information as long as the architecture and the firmware can be specified.

In a case in which the feature information storage unit 62 stores the attribute information table, the setting unit 64 acquires the attribute information from each of the plurality of storage devices 50, for example, at the time of initialization. Then, the setting unit 64 reads the feature information corresponding to the acquired attribute information from the attribute information table stored in the feature information storage unit 62. Then, the setting unit 64 sets the chunk and the stripe on the basis of the read feature information. Accordingly, the setting unit 64 is able to set the chunk and the stripe even when the storage device 50 does not output the feature information.

Further, the attribute information table may be stored in an external device. For example, the attribute information table may be stored in a server or the like on a network. In this case, for example, at the time of initialization, the setting unit 64 acquires the attribute information from each of the plurality of storage devices 50 and acquires the feature information corresponding to the acquired attribute information from the attribute information table stored in the external device. Accordingly, the storage system 30 is able to acquire the feature information from the outside even when the attribute information table is not stored in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system, comprising:
a plurality of non-volatile storage devices configured to be able to perform writing and reading of data independently, each of the plurality of storage devices being divided into a plurality of blocks and erasing data in units of a block, each of the plurality of blocks having a size that is unique for each storage device;
a control device configured to control writing of data and reading of data on the plurality of storage devices; and
a non-volatile feature information memory configured to store feature information including a start address and a size of each of the plurality of blocks for each of the plurality of storage devices, wherein
the control device includes
a setting unit configured to set a plurality of chunks obtained by dividing a storage region for each of the plurality of storage devices, and set a plurality of stripes obtained by dividing storage regions of all of the plurality of storage devices for all of the plurality of storage devices, and
a writing/reading unit configured to manage data stored in the plurality of storage devices in units of the stripes, wherein
at a time of initialization, the setting unit
acquires the feature information for each of the plurality of storage devices from the non-volatile feature information memory,
sets a size of a chunk that is unique for each storage device on the basis of the acquired feature information, and
sets, based on the acquired feature information, each of the chunks so that the chunk for at least one of the plurality of storage devices includes the entirety of one or more blocks, and sets each of the stripes to include two or more of the chunks.

2. The storage system according to claim 1, wherein the setting unit is configured to include two or more of the chunks selected from two or more different storage devices among the plurality of storage devices in each of the stripes.

3. The storage system according to claim 1, wherein each of the plurality of storage devices includes a plurality of non-volatile semiconductor memories, and
the blocks are regions obtained by dividing a storage region implemented by the plurality of non-volatile semiconductor memories.

4. The storage system according to claim 1, wherein the writing/reading unit is configured to invalidate data stored in the plurality of storage devices in units of the stripes.

5. The storage system according to claim 1, wherein the non-volatile feature information memory is configured to further store an attribute information table in which attribute information of each of the plurality of storage devices and the feature information indicating a forming region of the block of a corresponding storage device are stored in association with each other, wherein
the setting unit acquires the attribute information from each of the plurality of storage devices, reads the feature information corresponding to the acquired attribute information from the feature information storage unit, and sets the chunks based on the read feature information.

6. The storage system according to claim 1, wherein each of the plurality of storage devices does not output the feature information.

7. The storage system according to claim 1, wherein the setting unit is configured to acquire the feature information and set the chunks based on the acquired feature information.

8. The storage system according to claim 1, wherein the setting unit is configured to set a plurality of the stripes including the chunks obtained by selecting one chunk from each of the plurality of storage devices.

9. The storage system according to claim 1, wherein a plurality of the stripes including two or more of the chunks selected from different combinations of two or more storage devices among the plurality of storage devices are set.

10. The storage system according to claim 1, wherein the setting unit changes the number of blocks included in the chunk of a first storage device among the plurality of storage devices and the number of blocks included in the chunk of a second storage device.

11. The storage system according to claim 1, wherein the setting unit is configured to set the chunk of at least one of the plurality of storage devices to have a size which is a natural multiple of the size of the block.

12. The storage system according to claim 1, wherein the setting unit is configured to acquire positional information of a defective portion in each of the plurality of storage devices, and set each of the chunks to include the entire region excluding the defective portion in the block.

13. The storage system according to claim 1, wherein the control device is configured to include a plurality of control units that control writing of data and reading of data on different groups among the plurality of storage devices,
each of the control units includes the setting unit and the writing/reading unit, and
the setting unit of each of the control units sets the chunk of a unique size for the storage devices belonging to the corresponding group.

14. The storage system according to claim 1, wherein the setting unit is configured to set a plurality of write units obtained by dividing the stripe for each of the stripes,
the write unit is configured to include a part of each of the plurality of chunks included in the corresponding stripe, and
the writing/reading unit is configured to write a set of target data and a parity of the target data in the write unit.

* * * * *